(12) United States Patent
Lim

(10) Patent No.: US 12,556,837 B2
(45) Date of Patent: Feb. 17, 2026

(54) MOTION DETECTION DEVICE AND DETECTING METHOD THEREOF

(71) Applicant: PIXART IMAGING INC., Hsin-Chu County (TW)

(72) Inventor: Wooi-Kip Lim, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 62 days.

(21) Appl. No.: 18/754,171

(22) Filed: Jun. 26, 2024

(65) Prior Publication Data

US 2026/0006348 A1    Jan. 1, 2026

(51) Int. Cl.
*H04N 25/75* (2023.01)
*H04N 23/68* (2023.01)
*H04N 25/441* (2023.01)
*H04N 25/78* (2023.01)

(52) U.S. Cl.
CPC ......... *H04N 25/75* (2023.01); *H04N 23/6811* (2023.01); *H04N 25/441* (2023.01); *H04N 25/78* (2023.01)

(58) Field of Classification Search
None
See application file for complete search history.

(56) References Cited

U.S. PATENT DOCUMENTS 11,671,714 B1 * 6/2023 Xiao ................ G06T 7/246
348/362

\* cited by examiner

*Primary Examiner* — Mark T Monk
(74) *Attorney, Agent, or Firm* — HAUPTMAN HAM, LLP

(57) ABSTRACT

There is provided a motion detection device including a pixel array, multiple comparators and multiple logic check circuits. One comparator is coupled to a pair of pixel columns of the pixel array. The pixel array acquires a reference image and a current image. The comparators generate a reference feature position map corresponding to the first image and generate a current feature position map corresponding to the current image. The multiple logic check circuits process the reference feature position map and the current feature position map to detect a motion.

20 Claims, 14 Drawing Sheets

|  | Reference Image | | | | | | | | | |
|---|---|---|---|---|---|---|---|---|---|---|
| Row\Column | 1 | 2 | 3 | 4 | 5 | 6 | 7 | 8 | 9 | 10 |
| 1 | 51 | 52 | 39 | 49 | 49 | 52 | 45 | 52 | 39 | 43 |
| 2 | 40 | 48 | 39 | 43 | 42 | 59 | 47 | 39 | 40 | 45 |
| 3 | 42 | 51 | 50 | 44 | 38 | 64 | 50 | 39 | 48 | 52 |
| 4 | 44 | 44 | 51 | 63 | 45 | 70 | 41 | 43 | 42 | 55 |
| 5 | 34 | 40 | 42 | 62 | 60 | 81 | 45 | 43 | 40 | 41 |
| 6 | 39 | 43 | 39 | 49 | 51 | 62 | 43 | 44 | 33 | 24 |
| 7 | 40 | 55 | 43 | 45 | 45 | 59 | 48 | 46 | 39 | 25 |
| 8 | 39 | 56 | 43 | 48 | 49 | 69 | 40 | 46 | 33 | 37 |
| 9 | 40 | 59 | 54 | 52 | 62 | 68 | 33 | 37 | 27 | 32 |
| 10 | 39 | 55 | 44 | 63 | 52 | 47 | 31 | 33 | 26 | 33 |

↓ Shutter 1
⇣ Shutter 2

100B2         100B1
Feature Position Map of Reference Image

| 0 | 0 | 0 | 0 | 0 |
|---|---|---|---|---|
| 0 | 0 | 0 | 1 | 0 |
| 0 | 1 | 0 | 1 | 0 |
| 1 | 0 | 0 | 0 | 0 |
| 0 | 0 | 0 | 1 | 0 |
| 0 | 0 | 0 | 0 | 1 |
| 0 | 0 | 0 | 1 | 1 |
| 0 | 0 | 0 | 0 | 0 |
| 0 | 1 | 0 | 0 | 0 |
| 0 | 0 | 1 | 0 | 0 |

No Motion Current Image

| 1 | 2 | 3 | 4 | 5 | 6 | 7 | 8 | 9 | 10 |
|---|---|---|---|---|---|---|---|---|---|
| 52 | 46 | 39 | 43 | 48 | 46 | 45 | 46 | 38 | 36 |
| 39 | 43 | 39 | 39 | 42 | 51 | 47 | 34 | 40 | 39 |
| 43 | 46 | 53 | 37 | 39 | 54 | 49 | 35 | 52 | 45 |
| 45 | 38 | 51 | 55 | 45 | 60 | 43 | 38 | 43 | 48 |
| 35 | 36 | 41 | 56 | 62 | 72 | 44 | 36 | 40 | 37 |
| 38 | 38 | 49 | 42 | 52 | 53 | 41 | 39 | 34 | 21 |
| 38 | 48 | 44 | 38 | 45 | 51 | 47 | 41 | 38 | 22 |
| 39 | 50 | 44 | 42 | 48 | 61 | 39 | 40 | 32 | 32 |
| 40 | 49 | 54 | 45 | 63 | 57 | 33 | 33 | 27 | 28 |
| 40 | 47 | 46 | 55 | 52 | 41 | 31 | 30 | 26 | 28 |

FIG. 6A

Feature Position Map of Current Image 600B

| 1 | 0 | 1 | 0 | 1 |
|---|---|---|---|---|
| 0 | 0 | 0 | 1 | 1 |
| 0 | 1 | 0 | 1 | 1 |
| 1 | 0 | 0 | 1 | 0 |
| 0 | 0 | 0 | 1 | 1 |
| 0 | 0 | 0 | 1 | 1 |
| 0 | 1 | 0 | 1 | 1 |
| 0 | 1 | 0 | 0 | 0 |
| 0 | 1 | 1 | 0 | 0 |
| 0 | 0 | 1 | 1 | 0 |

FIG. 6B

Logic Check Result without motion

| 0 | 0 | 0 | 0 | 0 |
|---|---|---|---|---|
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |
| 0 | 0 | 0 | 0 | 0 |

FIG. 6C

Motion Current Image — 700A

| 1 | 2 | 3 | 4 | 5 | 6 | 7 | 8 | 9 | 10 |
|---|---|---|---|---|---|---|---|---|---|
| 47 | 36 | 46 | 51 | 44 | 48 | 46 | 39 | 36 | 29 |
| 43 | 40 | 36 | 42 | 50 | 45 | 34 | 37 | 40 | 32 |
| 43 | 46 | 40 | 35 | 54 | 53 | 35 | 44 | 43 | 31 |
| 38 | 51 | 55 | 42 | 43 | 43 | 38 | 45 | 49 | 37 |
| 35 | 43 | 56 | 60 | 73 | 46 | 36 | 42 | 38 | 35 |
| 36 | 36 | 44 | 52 | 58 | 45 | 33 | 36 | 27 | 22 |
| 43 | 44 | 40 | 43 | 54 | 49 | 41 | 38 | 32 | 21 |
| 45 | 41 | 41 | 45 | 58 | 44 | 38 | 33 | 33 | 31 |
| 48 | 52 | 45 | 63 | 62 | 35 | 32 | 29 | 29 | 28 |
| 47 | 45 | 54 | 52 | 40 | 36 | 30 | 26 | 29 | 31 |

FIG. 7A

Feature Position Map of Current Image — 700B

| 1 | 0 | 0 | 1 | 1 |
| 1 | 0 | 1 | 0 | 1 |
| 0 | 1 | 1 | 0 | 1 |
| 0 | 1 | 1 | 0 | 1 |
| 0 | 0 | 1 | 0 | 1 |
| 0 | 0 | 1 | 0 | 1 |
| 0 | 0 | 1 | 1 | 1 |
| 1 | 0 | 1 | 1 | 1 |
| 0 | 0 | 1 | 1 | 1 |
| 0 | 1 | 1 | 1 | 0 |

FIG. 7B

Logic Check Result with motion

| 0 | 0 | 0 | 0 | 0 |
|---|---|---|---|---|
| 0 | 0 | 0 | 1 | 0 |
| 0 | 0 | 0 | 1 | 0 |
| 1 | 0 | 0 | 0 | 0 |
| 0 | 0 | 0 | 1 | 0 |
| 0 | 0 | 0 | 0 | 0 |
| 0 | 0 | 0 | 0 | 0 |
| 0 | 0 | 0 | 0 | 0 |
| 0 | 1 | 0 | 0 | 0 |
| 0 | 0 | 0 | 0 | 0 |

FIG. 7C

| Row\Column | Reference Image | | | | | | | | | |
|---|---|---|---|---|---|---|---|---|---|---|
| | 1 | 2 | 3 | 4 | 5 | 6 | 7 | 8 | 9 | 10 |
| 1 | 59 | 45 | 45 | 43 | 56 | 45 | 52 | 45 | 45 | 37 |
| 2 | 46 | 42 | 45 | 37 | 48 | 51 | 54 | 34 | 46 | 39 |
| 3 | 48 | 44 | 58 | 38 | 44 | 56 | 58 | 34 | 55 | 45 |
| 4 | 51 | 38 | 59 | 55 | 52 | 61 | 47 | 37 | 48 | 48 |
| 5 | 39 | 35 | 48 | 54 | 69 | 70 | 52 | 37 | 46 | 36 |
| 6 | 45 | 37 | 45 | 43 | 59 | 54 | 49 | 38 | 38 | 21 |
| 7 | 46 | 48 | 49 | 39 | 52 | 51 | 55 | 40 | 45 | 22 |
| 8 | 45 | 49 | 49 | 42 | 56 | 60 | 46 | 40 | 38 | 32 |
| 9 | 46 | 51 | 62 | 45 | 71 | 59 | 38 | 32 | 31 | 28 |
| 10 | 45 | 48 | 51 | 55 | 60 | 41 | 36 | 29 | 30 | 29 |

No Motion Current Image

| 1 | 2 | 3 | 4 | 5 | 6 | 7 | 8 | 9 | 10 |
|---|---|---|---|---|---|---|---|---|---|
| 52 | 46 | 39 | 43 | 48 | 46 | 45 | 46 | 38 | 36 |
| 39 | 43 | 39 | 39 | 42 | 51 | 47 | 34 | 40 | 39 |
| 43 | 46 | 53 | 37 | 39 | 54 | 49 | 35 | 52 | 45 |
| 45 | 38 | 51 | 55 | 45 | 60 | 43 | 38 | 43 | 48 |
| 35 | 36 | 41 | 56 | 62 | 72 | 44 | 36 | 40 | 37 |
| 38 | 38 | 49 | 42 | 52 | 53 | 41 | 39 | 34 | 21 |
| 38 | 48 | 44 | 38 | 45 | 51 | 47 | 41 | 38 | 22 |
| 39 | 50 | 44 | 42 | 48 | 61 | 39 | 40 | 32 | 32 |
| 40 | 49 | 54 | 45 | 63 | 57 | 33 | 33 | 27 | 28 |
| 40 | 47 | 46 | 55 | 52 | 41 | 31 | 30 | 26 | 28 |

801C — | 1 | 1 | — 802C

Feature move from left to right

| 1 | 2 | 3 | 4 | 5 | 6 | 7 | 8 | 9 | 10 |
|---|---|---|---|---|---|---|---|---|---|
| 46 | 52 | 46 | 39 | 43 | 48 | 46 | 45 | 46 | 38 |
| 40 | 39 | 43 | 39 | 39 | 42 | 51 | 47 | 34 | 40 |
| 45 | 43 | 46 | 53 | 37 | 39 | 54 | 49 | 35 | 52 |
| 54 | 45 | 38 | 51 | 55 | 45 | 60 | 43 | 38 | 43 |
| 34 | 35 | 36 | 41 | 56 | 62 | 72 | 44 | 36 | 40 |
| 32 | 38 | 38 | 49 | 42 | 52 | 53 | 41 | 39 | 34 |
| 33 | 38 | 48 | 44 | 38 | 45 | 51 | 47 | 41 | 38 |
| 35 | 39 | 50 | 44 | 42 | 48 | 61 | 39 | 40 | 32 |
| 36 | 40 | 49 | 54 | 45 | 63 | 57 | 33 | 33 | 27 |
| 34 | 40 | 47 | 46 | 55 | 52 | 41 | 31 | 30 | 26 |

No Motion Current Image

| 1 | 2 | 3 | 4 | 5 | 6 | 7 | 8 | 9 | 10 | |
|---|---|---|---|---|---|---|---|---|----|--|
| 52 | 46 | 39 | 43 | 48 | 46 | 45 | 46 | 38 | 36 | ← 800CR |
| 39 | 43 | 39 | 39 | 42 | 51 | 47 | 34 | 40 | 39 | |
| 43 | 46 | 53 | 37 | 39 | 54 | 49 | 35 | 52 | 45 | |
| 45 | 38 | 51 | 55 | 45 | 60 | 43 | 38 | 43 | 48 | |
| 35 | 36 | 41 | 56 | 62 | 72 | 44 | 36 | 40 | 37 | |
| 38 | 38 | 49 | 42 | 52 | 53 | 41 | 39 | 34 | 21 | |
| 38 | 48 | 44 | 38 | 45 | 51 | 47 | 41 | 38 | 22 | |
| 39 | 50 | 44 | 42 | 48 | 61 | 39 | 40 | 32 | 32 | |
| 40 | 49 | 54 | 45 | 63 | 57 | 33 | 33 | 27 | 28 | |
| 40 | 47 | 46 | 55 | 52 | 41 | 31 | 30 | 26 | 28 | |

801C → | 1 | 1 | ← 802C

Feature move from right to left

| 1 | 2 | 3 | 4 | 5 | 6 | 7 | 8 | 9 | 10 | |
|---|---|---|---|---|---|---|---|---|----|--|
| 46 | 39 | 43 | 48 | 46 | 45 | 46 | 38 | 36 | 29 | ← 800CR |
| 43 | 39 | 39 | 42 | 51 | 47 | 34 | 40 | 39 | 33 | |
| 46 | 53 | 37 | 39 | 54 | 49 | 35 | 52 | 45 | 30 | |
| 38 | 51 | 55 | 45 | 60 | 43 | 38 | 43 | 48 | 38 | |
| 36 | 41 | 56 | 62 | 72 | 44 | 36 | 40 | 37 | 31 | |
| 38 | 49 | 42 | 52 | 53 | 41 | 39 | 34 | 21 | 24 | |
| 48 | 44 | 38 | 45 | 51 | 47 | 41 | 38 | 22 | 15 | |
| 50 | 44 | 42 | 48 | 61 | 39 | 40 | 32 | 32 | 28 | |
| 49 | 54 | 45 | 63 | 57 | 33 | 33 | 27 | 28 | 29 | |
| 47 | 46 | 55 | 52 | 41 | 31 | 30 | 26 | 28 | 30 | |

MOTION DETECTION DEVICE AND DETECTING METHOD THEREOF

FIELD OF THE DISCLOSURE

This disclosure generally relates to a motion detection device and, more particularly, to a motion detection device using strong features in one image frame as a reference to determine whether a motion is detected or not, and a motion detecting method of the motion detection device.

BACKGROUND OF THE DISCLOSURE

In the conventional motion detection, two light signals sequentially acquired in two exposure times are compared to determine whether a motion is detected or not. However, the light signals acquired in a previous exposure time among the two exposure times will decay with time. If an interval time between the two exposure times is long enough (e.g., the pixel array having a large size or a low frame rate in a sleep mode), the light signals acquired in the previous exposure time may totally be gone.

Accordingly, it is required to provide another motion detection method that will not be affected by the long interval time between two exposure times.

The information disclosed in this BACKGROUND is merely intended to increase understanding of the general background of the invention and should not be taken as an admission or in any way implied that the relevant information constitutes prior art that is already known to a person of ordinary skill in the art.

SUMMARY

The present disclosure provides a motion detection device that uses strong features (ignoring other features) in a reference image frame to generate a feature position map, and identifies a motion according to a variation of positions of the strong features between feature position maps of the reference image and a current image, and a motion detection method of the motion detection device.

The present disclosure provides a motion detection device including a first pixel, a second pixel and a comparator. The second pixel is adjacent to the first pixel. The comparator is coupled to the first pixel and a second pixel, and configured to output a first comparison result indicating a first signal difference between the first and second pixels as a reference difference, output a second comparison result indicating a second signal difference between the first and second pixels as a current difference. The first comparison result is obtained by exposing the first pixel and the second pixel using different shutter times. The second comparison result is obtained by exposing the first pixel and the second pixel using a same shutter time.

The present disclosure further provides a motion detection device including a first pixel, a second pixel, a third pixel and a comparator. The second pixel and third pixel are adjacent to the first pixel at two sides of the first pixel. The comparator is coupled to the first pixel without via any switch, coupled to the second pixel via a second switch and coupled to the third pixel via a third switch. The comparator is configured to output a first comparison result indicating a signal difference between the first and second pixels as a first reference difference, output a second comparison result indicating a signal difference between the first and third pixels as a second reference difference, output a third comparison result indicating a signal difference between the first and second pixels as a first current difference, and output a fourth comparison result indicating a signal difference between the first and third pixels as a second current difference. The first comparison result is obtained by exposing the first pixel and the second pixel using different shutter times. The second comparison result is obtained by exposing the first pixel and the third pixel using different shutter times. The third comparison result is obtained by exposing the first pixel and the second pixel using a same shutter time. The fourth comparison result is obtained by exposing the first pixel and the third pixel using the same shutter time.

The present disclosure further provides a motion detection method of a motion detection device. The motion detection device includes a pixel array, multiple comparators respectively coupled to a pair of pixel columns of the pixel array, multiple flip flops each coupled to one comparator, and multiple logic check circuits each coupled to one flip flop and one corresponding comparator coupled to the one flip flop. The motion detection method includes the steps of: generating a reference image in which one pixel column among the pair of pixel columns is exposed by a first shutter time and the other one pixel column among the pair of pixel columns is exposed by a second shutter time, different from the first shutter time; comparing light signals in the reference image at the one pixel column among the pair of pixel columns with light signals in the reference image at the other one pixel column among the pair of pixel columns by the multiple comparators to generate a reference feature position map; generating a current image in which the one pixel column among the pair of pixel columns is exposed by the first shutter time and the other one pixel column among the pair of pixel columns is exposed by the first shutter time; comparing light signals in the current image at the one pixel column among the pair of pixel columns with light signals in the current image at the other one pixel column among the pair of pixel columns by the multiple comparators to generate a current feature position map; and processing the reference feature position map and the current feature position map by the multiple flip flops and the multiple logic check circuits to detect a motion.

The motion detection device and method of the present disclosure are adaptable to a low frame rate application.

The motion detection method of the present disclosure may be performed in the analog phase without going through analog-to-digital converter (ADC) and digital processing.

BRIEF DESCRIPTION OF DRAWINGS

Other objects, advantages, and novel features of the present disclosure will become more apparent from the following detailed description when taken in conjunction with the accompanying drawings.

FIG. 1A is a schematic diagram of a reference image acquired by a pixel array using different shutter times at odd and even pixel columns of the pixel array of a motion detection device according to one embodiment of the present disclosure.

FIG. 1B is a schematic diagram of a feature position map obtained from FIG. 1A.

FIG. 6A is a schematic diagram of a current image with no motion to be compared with the reference image in FIG. 1A.

FIG. 6B is a schematic diagram of a feature position map obtained from FIG. 6A.

FIG. 6C is a schematic diagram of a logic check result by processing the feature position maps in FIGS. 1B and 6B.

FIG. 7A is a schematic diagram of a current image with a motion to be compared with the reference image in FIG. 1A.

FIG. 7B is a schematic diagram of a feature position map obtained from FIG. 7A.

FIG. 7C is a schematic diagram of a logic check result by processing the feature position maps in FIGS. 1B and 7B.

FIG. 8A is a schematic diagram of a reference image used to calculate a reference feature position map between one even pixel and two adjacent odd pixels according to a second embodiment of the present disclosure.

FIG. 8B is a schematic diagram of a current image having no movement from FIG. 8A and having a left-to-right movement.

FIG. 8C is a schematic diagram of a current image having no movement from FIG. 8A and having a right-to-left movement.

DETAILED DESCRIPTION OF THE DISCLOSURE

Figure 2:
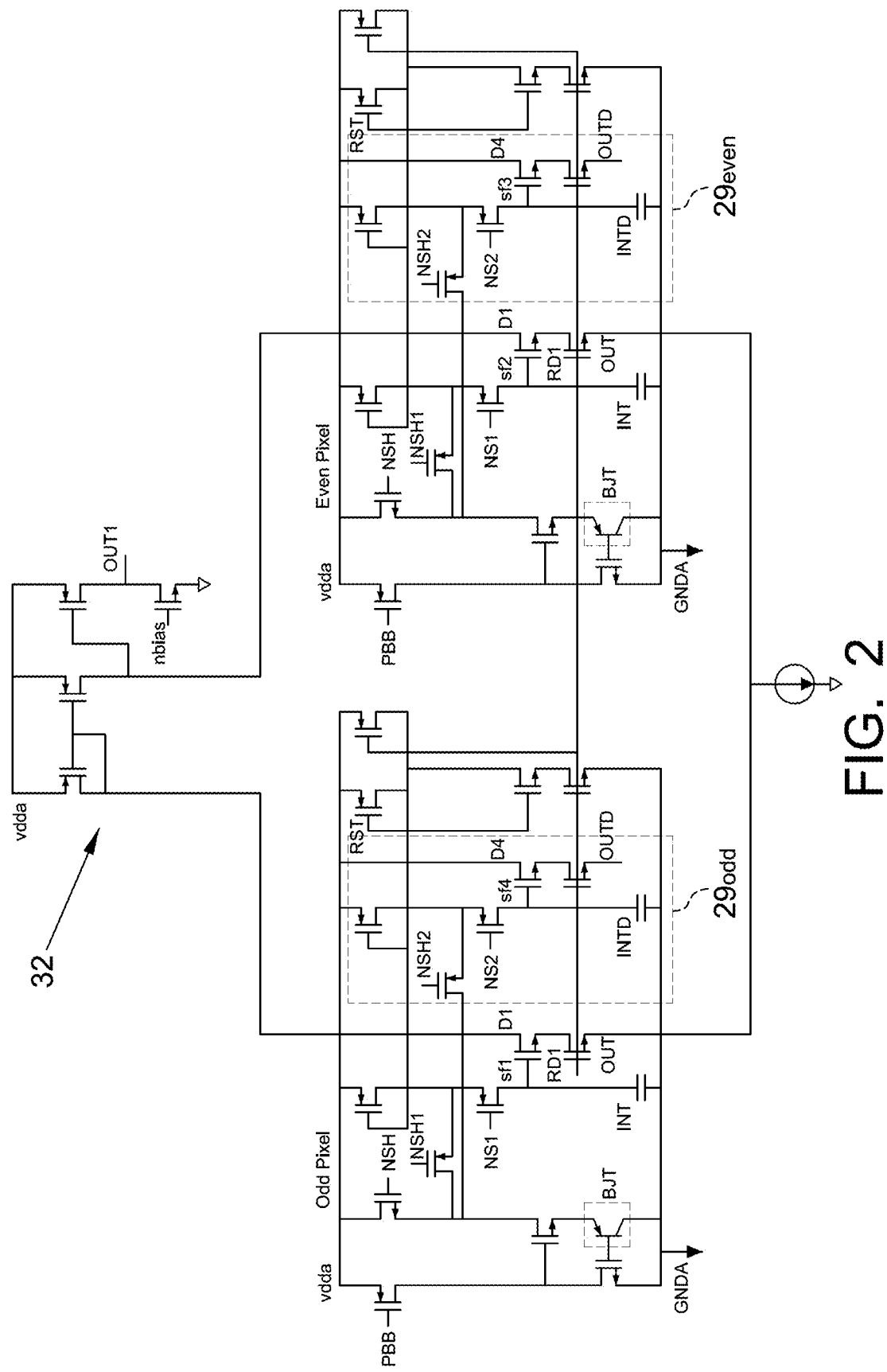
FIG. 2 is a circuit diagram of two adjacent pixels of a pixel array of a motion detection device according to a first embodiment of the present disclosure.

It should be noted that, wherever possible, the same reference numbers will be used throughout the drawings to refer to the same or like parts.

One objective of the present disclosure is to provide a motion detection device that generates a reference image and a current image sequentially. The reference image is used to generate a feature position map of strong features. The current image is used to check whether these strong features are location-changed or not to determine whether a motion is detected or not.

In the present disclosure, the reference image may be updated at a predetermined time interval, e.g., every two or every predetermined number of frame periods. That is, the current image is a next image acquired right after the reference image, or may be an image acquired behind the reference image more than two frame periods. In the present disclosure, when a motion is detected, the motion detection device is, for example, woken up from a sleep mode or a low power mode and enter a normal mode, but not limited thereto. Or the reference image will not be updated as long as no motion is detected.

Please refer to FIGS. 1A and 1B, FIG. 1A is a schematic diagram of a reference image acquired by a pixel array using different shutter times at odd and even pixel columns of the pixel array of a motion detection device according to one embodiment of the present disclosure; and FIG. 1B is a schematic diagram of a feature position map obtained from FIG. 1A. The motion detection device is, for example, an optical mouse, but not limited to.

In the present disclosure, the motion detection device generates a reference image to be compared with a current image, which an image frame acquired within a different exposure period from the reference image, to detect a motion. In the reference image shown in FIG. 1A, odd pixel columns are exposed using a first shutter time (e.g., shown as Shutter 1), and even pixel columns are exposed using a second shutter (e.g., shown as Shutter 2), which is 10% to 20% longer than the first shutter time. That is, the shutter times of the odd pixel columns and the even pixel columns are different. Values in the reference image indicate light signals detected by each pixel. The values are larger when stronger light is detected.

The reference feature position map shown in FIG. 1B is obtained by comparing odd pixels and even pixels using built-in voltage comparators of the pixel array (described below). For example in a pixel pair 100A1 (including one odd pixel and one even pixel) of the reference image in FIG. 1A, when the odd pixel has a light signal higher than that of the even pixel, it means that there is a strong feature at a position of the pixel pair 100A and thus a value "1" is given at 100B1 in the reference feature position map as shown in FIG. 1B. On the contrary, when the odd pixel has a light signal lower than that of the even pixel (e.g., pixel pair 100A2 of the reference image), it means that there is no strong feature and thus a digital "0" is given at 100B2 in the reference feature position map as shown in FIG. 1B. Other values in the reference feature map position are obtained in the same way. A size of the reference feature position map in a transverse direction is a half of that of the reference image, e.g., from 10×10 to 10×5.

Figure 3:
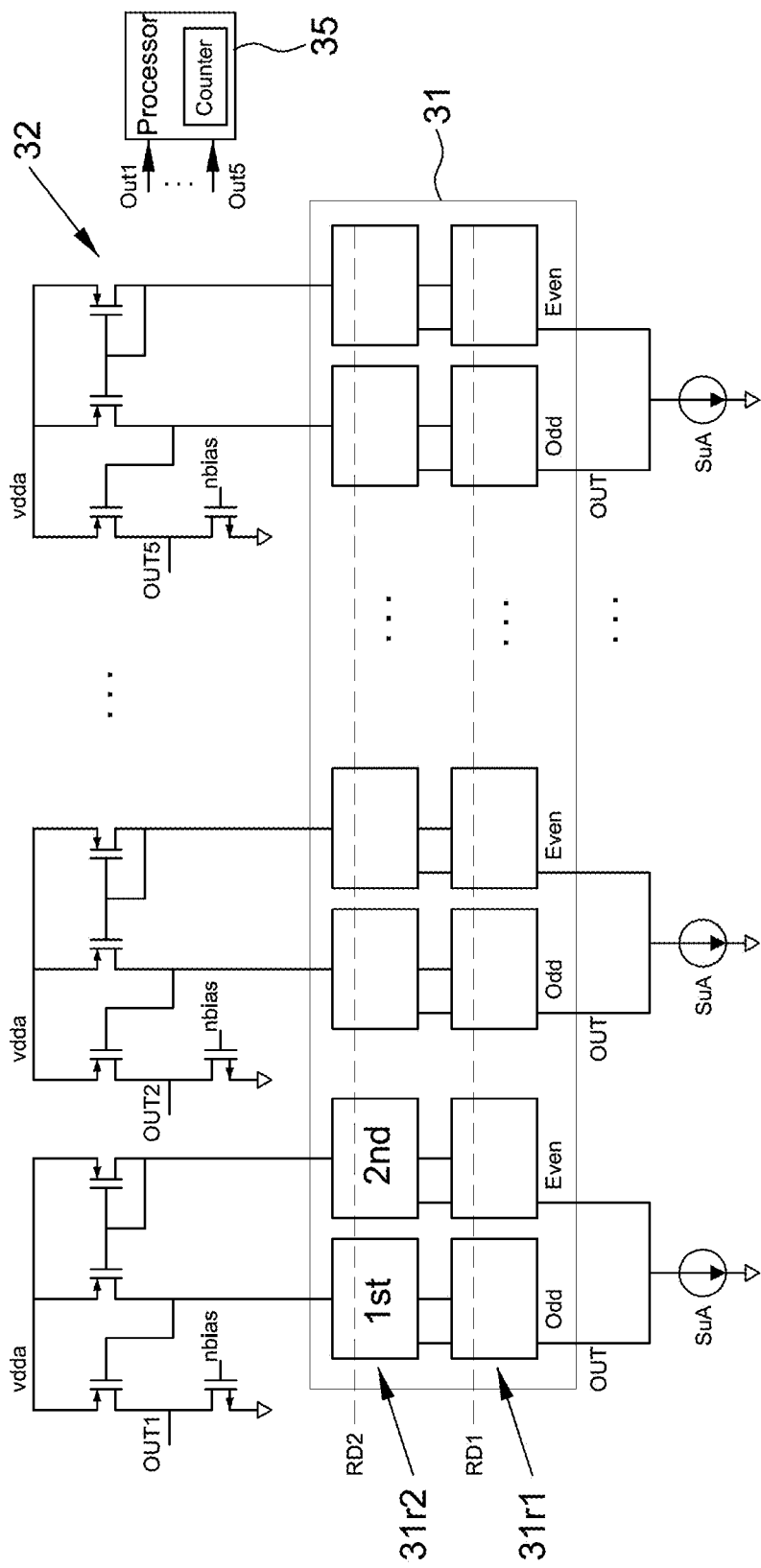
FIG. 3 is a schematic block diagram of a pixel array of a motion detection device according to a first embodiment of the present disclosure.
Figure 4:
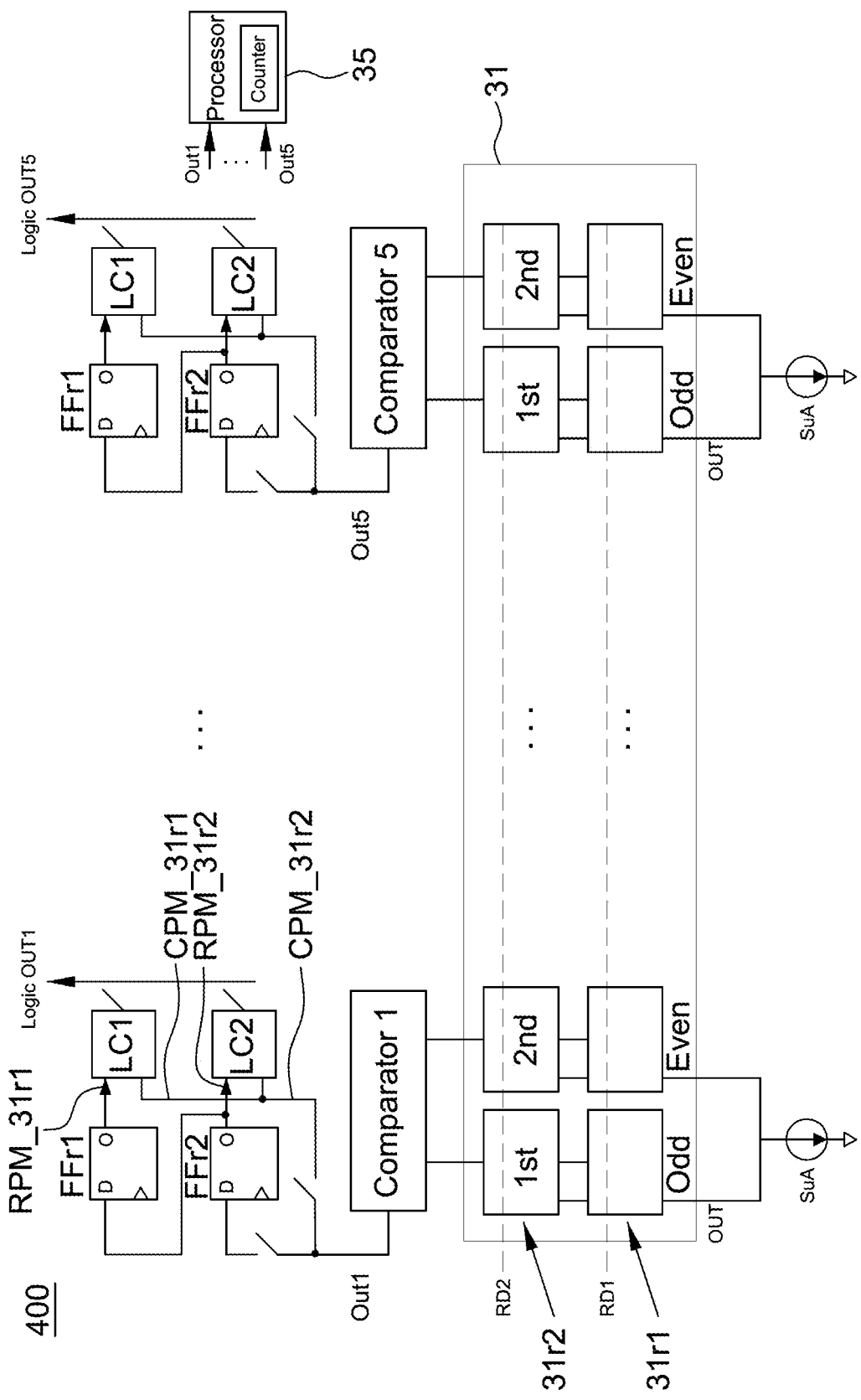
FIG. 4 is a schematic block diagram of a motion detection device according to a first embodiment of the present disclosure.

Please refer to FIGS. 2-4, FIG. 2 is a circuit diagram of two adjacent pixels (shown as Odd Pixel and Even Pixel) of a pixel array 31 of a motion detection device 400 (shown in FIG. 4) according to a first embodiment of the present disclosure; FIG. 3 is a schematic block diagram of a pixel array 31 of a motion detection device 400 according to a first embodiment of the present disclosure; and FIG. 4 is a schematic block diagram of a motion detection device 400 according to a first embodiment of the present disclosure.

The motion detection device 400 includes a pixel array 31, multiple comparators 32 (e.g., shown as Comparator 1 to Comparator 5 in FIG. 4) respectively coupled to a pair of pixel columns (e.g., shown as Odd pixel column and Even pixel column) of the pixel array 31, multiple groups of flip flops each group (e.g., shown as FFr1 and FFr2 in FIG. 4) being coupled to one comparator 32, multiple logic check circuits (e.g., shown as LC1 and LC1 2 in FIG. 4) each logic check circuit being coupled to one flip flop and one corresponding comparator 32 coupled to the one flip flop, and a processor 35. It should be mentioned that although FIGS. 3-4 show that the pixel array 31 includes two pixel rows 31r1 and 31r2 and corresponding two rows of flip flops FFr1 and FFr2 as well as two rows of logic check circuits LC1 and LC2, it is only intended to illustrate but not to limit the present disclosure. To generate the reference image shown in FIG. 1A, the pixel array 31 includes ten pixel rows and ten pixel columns, and each pixel row has a corresponding flip flop row as well as a corresponding logic check circuit row. That is, every two pixel columns share one comparator, one group of flip flops and one group of logic check circuits, wherein each group of flip flops has a number of flip flops identical to a number of pixel rows the pixel array 31, and each group of logic check circuits has a number of logic check circuits identical to a number of pixel rows of the pixel array 31.

The Odd Pixel (e.g., shown as 1st in FIGS. 3-4) and the Even Pixel (e.g., shown as 2nd in FIGS. 3-4) are two adjacent pixels. Each comparator 32 is coupled to one Odd Pixel and one Even Pixel. For example in FIG. 4, the comparator 1 is coupled to a first pixel 1st and a second pixel 2nd in the pixel row 31r2. The first pixel 1st and the second pixel 2nd are BJT pixels, and respectively include a source follower transistor (e.g., shown as sf1 and sf2 in FIG. 2) and a readout transistor (e.g., shown as RD1 and RD2 in FIG. 2). Drains of the source follower transistors sf1 and sf2 of the first pixel 1st and the second pixel 2nd are coupled to a differential pair of the comparator 32. Sources of the readout transistors RD1 and RD2 of the first pixel 1st and the second pixel 2nd are coupled to a current source of the comparator 32.

The first embodiment is described by taking comparator 1 as an example, and operations of other comparators are the same and will not be repeated herein. The comparator 1 outputs a first comparison result (e.g., 100B1 and 100B2 shown in FIG. 1B) indicating a first signal difference between the first and second pixels (e.g., pixel pairs 100A1 and 100A2 shown in FIG. 1A) as a reference difference. In obtaining the first comparison result 100B1 and 100B2, the first pixel (e.g., left pixel in 100A1 and 100A2) is exposed by a first shutter time and the second pixel (e.g., right pixel in 100A1 and 100A2) is exposed by a second shutter time different from the first shutter time. As mentioned above, the second shutter time is 10% to 20% longer than the first shutter time to distinguish whether the difference is strong enough. The flip flop FFr2 is used to record the first comparison result 100B1 and 100B2. When the comparator 1 outputs a new first comparison result between the first and second pixels in the pixel row 31r1, the previous first comparison result in FFr2 moves to FFr1 and the new first comparison result overwrites FFr2, i.e. using a first-in first-out sequence in the multiple flip flops.

Please refer to FIGS. 6A and 7A, FIG. 6A is a schematic diagram of a current image with no motion captured by the pixel array 31 to be compared with the reference image in FIG. 1A; and FIG. 7A is a schematic diagram of a current image with a motion captured by the pixel array 31 to be compared with the reference image in FIG. 1A. FIGS. 6B and 7B are feature position maps respectively obtained from FIGS. 6A and 7A.

After the pixel array 31 captured the current image, the comparator 1 further outputs a second comparison result (e.g., shown as 600B in FIGS. 6B and 700B in FIG. 7B) indicating a second signal difference between the first and second pixels (e.g., pixel pair 600A in FIG. 6A and pixel pair 700A in FIG. 7A) as a current difference. In obtaining the second comparison result 600B and 700B, the first pixel (e.g., left pixel in 600A and 700A) is exposed by the first shutter time and the second pixel (e.g., right pixel in 600A and 700A) is also exposed by a first shutter time. That is, all pixels in the pixel array 31 are exposed using the same shutter time to acquire the current image.

Figure 5:
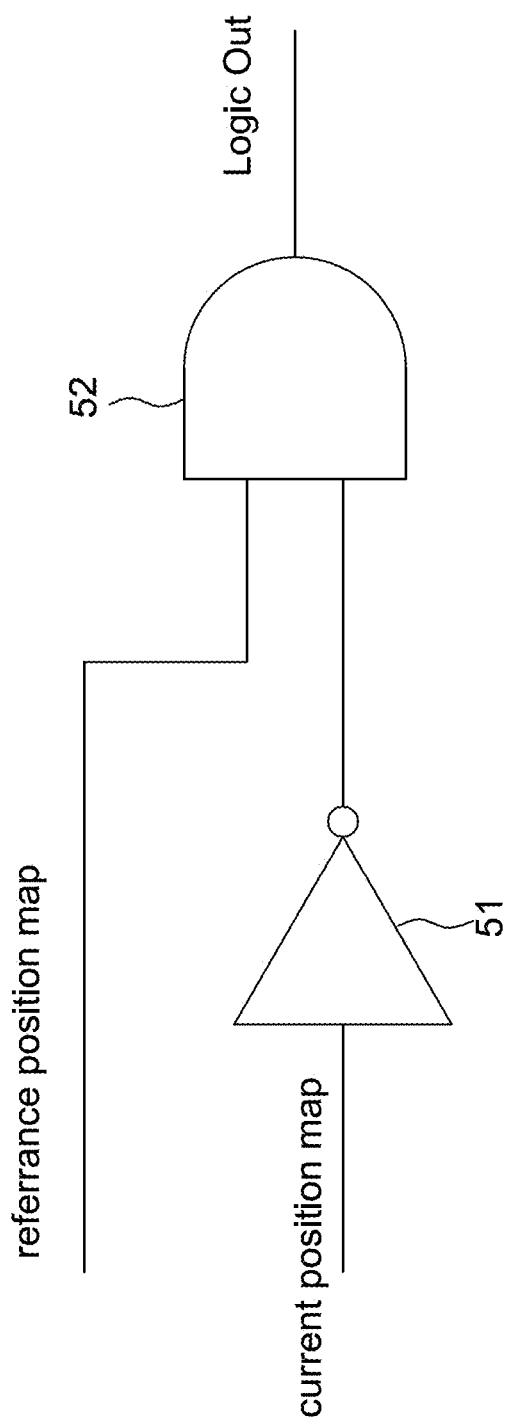
FIG. 5 is a schematic diagram of a logic check circuit of a motion detection device according to a first embodiment of the present disclosure.

The logic check circuit LC2 is coupled to the comparator 1 and the flip flop FFr2. Referring to FIG. 5, each logic check circuit includes an inverter 51 and an AND gate 52. For example, an input of the inverter 51 of LC2 is used to receive the second comparison result (e.g., shown as CPM_31r2). A first input of the AND gate 52 of LC2 is used to receive the first comparison result (e.g., shown as RPM_31r2) from the flip flop FFr2, and a second input of the AND gate 52 of LC2 is coupled to an output of the inverter 51 of LC2. In the present disclosure, the first comparison result RPM_31r2 and the second comparison result CPM_31r2 are respectively obtained corresponding to difference image frames, i.e. the reference image and the current image captured by the pixel array 31. More specifically, the first comparison result RPM_31r2 is only transferred to FFr2 without being transferred to LC2, and the second comparison result CPM_31r2 is only transferred to LC2 without being transferred to FFr2, e.g., implemented by switches.

Operations of other pixel column pairs, other comparators (e.g., comparator 2 to 5), other flip flops and other logic check circuits are identical to the first and second pixel column, the comparator 1, the flip flop FFr2 and the logic check circuit LC2 mentioned above only having timing difference (e.g., controlled by row selection signals and readout signals generated by a timing controller), and thus details thereof are known after understanding the operations mentioned above.

Referring to FIG. 4 again, the pixel array 31 includes multiple pairs of first and second pixels arranged in a matrix. Each of the multiple comparators 32 is coupled to one column of the pairs of first and second pixels in the matrix. In this way, the multiple comparators (e.g., comparator 1 to 5) output multiple first comparison results as a reference feature position map as shown in FIG. 1B and output multiple second comparison results as a current feature position map as shown in FIGS. 6B and 7B. The multiple logic check circuits process the reference feature position map FIG. 1B with the current feature position map in FIGS. 6B and 7B to identify a motion. For example, FIG. 6C is a schematic diagram of a logic check result by processing the feature position maps in FIGS. 1B and 6B by the multiple logic check circuits; and FIG. 7C is a schematic diagram of a logic check result by processing the feature position maps in FIGS. 1B and 7B by the multiple logic check circuits.

The processor 35 is, for example, a micro controller unit (MCU), an application specific integrated circuit (ASIC) or a field programmable gate array (FPGA), and is used to control the ON/OFF of switching devices and to identical a motion. The processor 35 receives a reference feature position map in FIG. 1B, recognizes and records positions in the reference feature position map having strong features (e.g., indicated by "1"). The processor 35 determines a number of second comparison results in the current feature position map in FIGS. 6B and 7B to be processed by the logic check circuits according to first comparison results indicating strong features in the reference feature position map. For example, the processor 35 controls the logic check circuits associated with the "1" positions in the reference feature position map to be activated, and controls logic check circuits associated with the "0" positions in the reference feature position map to be deactivated. That is, in FIGS. 6B and 7B, only positions with bold blocks, which correspond to strong features in FIG. 1B, are processed by the corresponding logic check circuits, and other positions are ignored.

As shown in FIG. 6C, if there is no motion, the logic check result outputted by the multiple logic check circuits contains only "0". As shown in FIG. 7C, if there is a motion, the logic check result outputted by the multiple logic check circuits contains some "1". In one aspect, for anti-noise purpose, the processor 35 confirms a motion when a number of "1" in the logic check result exceeds a predetermined threshold. In another aspect, the strong features may be indicated by "0".

To save more power, the multiple comparators 32 are arranged only corresponding to a part of the pairs (½ or ⅓) of first and second pixel columns in a matrix of the pixel array 31. That is, not every pixel columns of the pixel array 31 is used to detect the motion.

In another aspect, the processor 35 determines a part of strong features in the reference feature position map to be processed by the logic check circuits. For example, the processor 35 includes a counter to count to a predetermined number of strong features, e.g., ten strong features, and the processor 35 activates ten logic check circuits associated with the ten strong features to process the first comparison result and the second comparison result thereof. In this way, the consumption power can also be reduced. That is, in the present disclosure, the processor 35 may adaptively select the processed region of the reference feature position map in FIG. 1B and the current feature position map in FIGS. 6B and 7B by the logic check circuits according to contents of the reference image, e.g., processor 35 being arranged to receive Out1 to Out5 from the comparator 1 to comparator 5 to make the selection.

To increase the detection sensitivity, comparators of the motion detection device of the present disclosure further compares one pixel column (e.g., even pixel column in FIGS. 8A-8C) with two adjacent pixel columns (e.g., odd pixel columns shown in FIGS. 8A-8C) by using switching technique.

Figure 9:
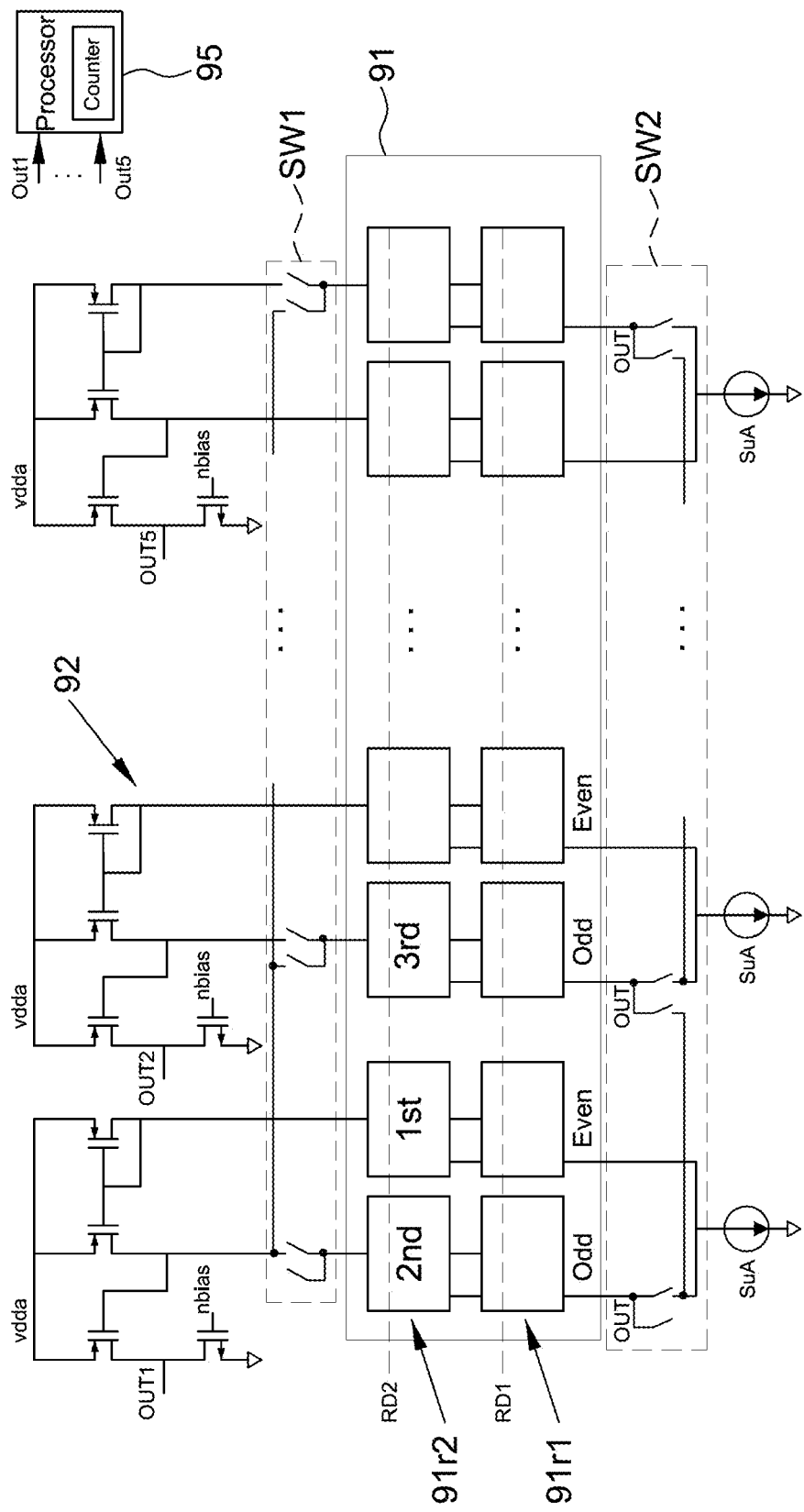
FIG. 9 is a schematic block diagram of a pixel array of a motion detection device according to a second embodiment of the present disclosure.

Please refer to FIG. 9, it is a schematic block diagram of a pixel array of a motion detection device 1000 (shown in FIG. 10) according to a second embodiment of the present disclosure. The difference between the second embodiment and the first embodiment is that the second embodiment further includes first switches SW1 and second switches SW2 used to connect and disconnect the odd pixel columns, e.g., shown as a second pixel 2nd or a third pixel 3rd to the comparators 92.

Figure 10:
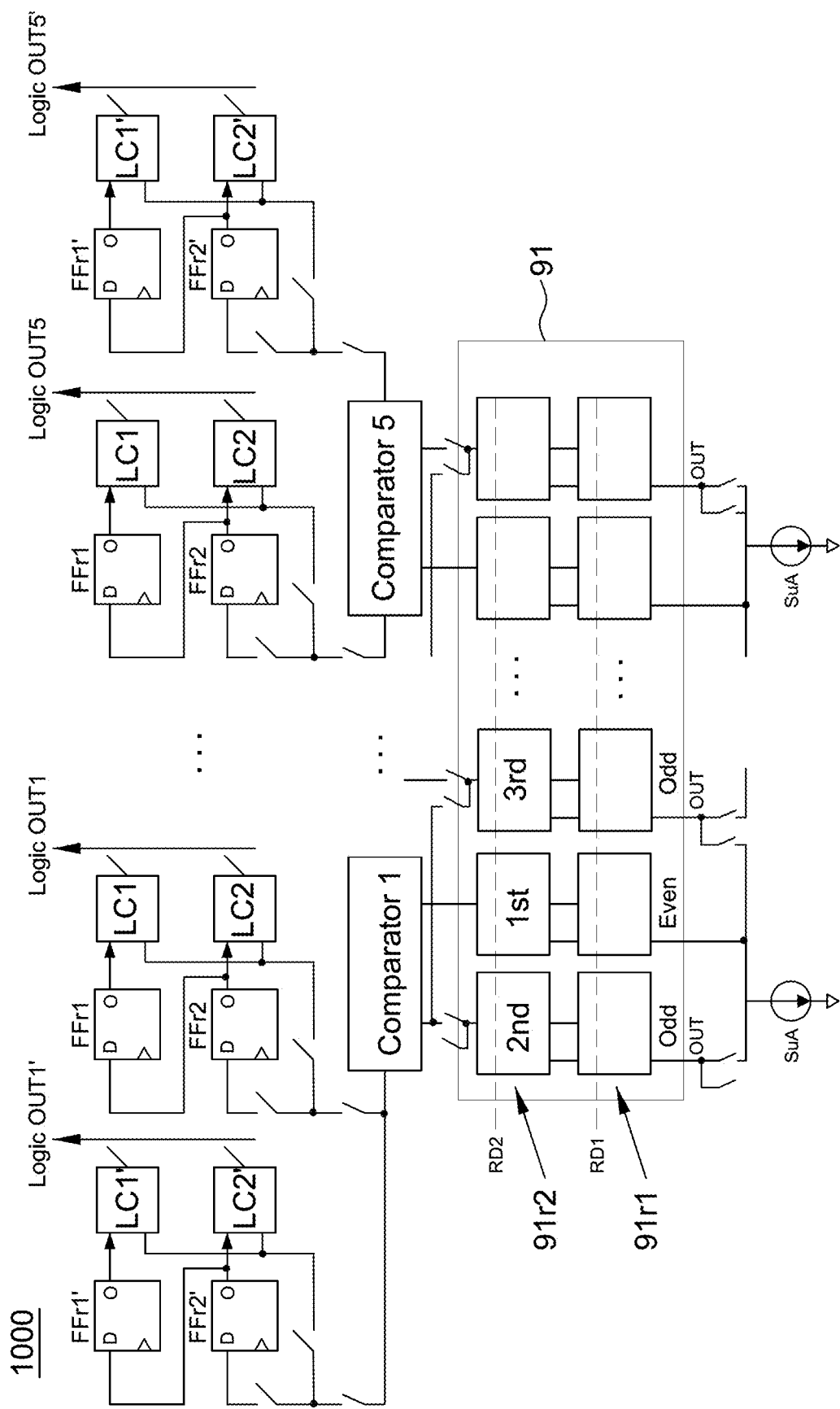
FIG. 10 is a schematic block diagram of a motion detection device according to a second embodiment of the present disclosure.

The motion detection device 1000 includes a pixel array 91, multiple comparators 92 (e.g., shown as Comparator 1 to Comparator 5 in FIG. 10), multiple flip flops (e.g., shown as FFr1, FFr2, FFr1' and FFr2' in FIG. 10) and multiple logic check circuits (e.g., shown as LC1, LC2, LC1' and LC 2' in FIG. 10).

The second embodiment is also described using a first pixel 1st, a second pixel 2nd and a third pixel 3rd. One of ordinary skill in the art would understand operations of other pixels after understanding the operations of the pixels 1st to 3rd.

The second pixel 2nd and the third pixel 3rd are adjacent to the first pixel 1st at two sides of the first pixel 1st. For example, FIGS. 9-10 show that the first pixel 1st is an even pixel and the second and third pixels are odd pixels, but not limited thereto.

The second embodiment is also described by using a comparator 1 as an example, and operations of other comparators are known based on the descriptions regarding the comparator 1. The comparator 1 is coupled to the first pixel 1st without via any switch, but is coupled to the second pixel 2nd via a second switch and coupled to the third pixel 3rd via a third switch. The comparator 1 outputs a first comparison result (e.g., position 801R in a reference feature map shown in FIG. 8A) indicating a signal difference between the first and second pixels (e.g., pixel pair 800AL shown in FIG. 8A) as a first reference difference, e.g., switching SW1 and SW2 to connect the second pixel 2nd to the comparator 1 and disconnect the third pixel 3rd from the comparator 1. The comparator 1 further outputs a second comparison result (e.g., position 802R in the reference feature map shown in FIG. 8A) indicating a signal difference between the first and third pixels (e.g., pixel pair 800AR shown in FIG. 8A) as a second reference difference, e.g., switching SW1 and SW2 to connect the third pixel 3rd to the comparator 1 and disconnect the second pixel 2nd from the comparator 1. Similarly, in obtaining the first comparison result 801R, the first pixel 1st is exposed by a first shutter time and the second pixel 2nd is exposed by a second shutter time, different from the first shutter time; and in obtaining the second comparison result 802R, the first pixel 1st is exposed by the first shutter time and the third pixel is exposed by the second shutter time. In one aspect, the second shutter time is 10% to 20% longer than the first shutter time. FIG. 8A only shows a first comparison result 801R and a second comparison result 802R of the reference feature position map. By using the same method as described in FIGS. 1A and 1B, one reference feature position map is obtained when the comparator 1 is coupled to an odd pixel (e.g., second pixel 2nd) at left of the event pixel (e.g., the first pixel 1st), and another reference feature position map is obtained when the comparator 1 is coupled to an odd pixel (e.g., second pixel 3rd) at right of the event pixel (e.g., the first pixel 1st).

The comparator 1 outputs a third comparison result (e.g., positions 801C in current feature maps shown in FIGS. 8B and 8C) indicating a signal difference between the first and second pixels (e.g., pixel pair 800BL shown in FIG. 8B and pixel pair 800CL shown in FIG. 8C) as a first current difference, e.g., switching SW1 and SW2 to connect the second pixel 2nd to the comparator 1 and disconnect the third pixel 3rd from the comparator 1. The comparator 1 further output a fourth comparison result (e.g., positions 802C in current feature maps shown in FIGS. 8B and 8C) indicating a signal difference between the first and third pixels (e.g., pixel pair 800BR shown in FIG. 8B and pixel pair 800CR shown in FIG. 8C) as a second current difference, e.g., switching SW1 and SW2 to connect the third pixel 3rd to the comparator 1 and disconnect the second pixel 2nd from the comparator 1. Similarly, in obtaining the third comparison result 801C and the fourth comparison result 802C, the first pixel 1st, the second pixel 2nd and the third pixel 3rd are exposed using the same shutter time, e.g., the first shutter time.

FIGS. 8B and 8C only respectively show a third comparison result 801C and a fourth comparison result 802C of the current feature position maps. By using the same method as described in FIGS. 6A-6B and 7A-7B, one current feature position map is obtained when the comparator 1 is coupled to an odd pixel (e.g., second pixel 2nd) at left of the event pixel (e.g., the first pixel 1st), and another current feature position map is obtained when the comparator 1 is coupled to an odd pixel (e.g., second pixel 3rd) at right of the event pixel (e.g., the first pixel 1st).

In the second embodiment, the first comparison result 801R and the second comparison result 802R are obtained from a first image frame, and the third comparison result 801C and the fourth comparison result 802C are obtained from a second image frame, different from the first image frame.

A first flip flop (e.g., FFr2) is coupled to the comparator 1 via a first output switch to receive the first comparison result 801R. A second flip flop (e.g., FFr2') is coupled to the comparator 1 via a second output switch to receive the second comparison result 802R. A first logic check circuit (e.g., LC2) is coupled to the first flip flop FFr2 and is coupled to the comparator 1 via the first output switch. A second logic check circuit (e.g., LC2') is coupled to the second flip flop FFr2' and is coupled to the comparator 1 via the second output switch. The first output switch and the second output switch are preferably not conducted at the same time. In one aspect, when the second pixel 2nd is coupled to the comparator 1, an output of the comparator 1 is coupled to FFr2 or LC2; and when the third pixel 3rd is coupled to the comparator 1, the output of the comparator 1 is coupled to FFr2' or LC2'. In this way, the multiple flip flops are able to store two reference feature position maps, and the multiple logic check circuits are able to receive two current feature position maps.

In the aspect that only the pixel pair 800AR and 800BR/800CR are used to detect a motion, similar to the first embodiment, although a left-to-right movement can be detected, e.g., "1" at 802R in FIG. 8A changing to "0" at 802C in FIG. 8B, a right-to-left movement cannot be detected, e.g., 802C in FIG. 8C still "1" indicating no motion. In the second embodiment, by checking another pixel pair 800AL and 800BL/800CL, both the left-to-right movement and the right-to-left movement can be detected such that the sensitivity is increased.

In the second embodiment, a processor 95 is also used to control switching devices and to determine and record strong features in the reference feature position map, such that positions in the current feature position map corresponding only to the strong features will be processed by multiple flip flops and multiple logic check circuits, similar to the operations of the processor 35 in the first embodiment.

It should be mentioned that although FIGS. 9-10 show that the even pixels are connected to the comparators 92 without passing a switch, the present disclosure is not limited thereto. In another aspect, the odd pixels are connected to the comparators 92 without passing a switch but the even pixels are connected to the comparators 92 passing a switch. In a further aspect, all pixels are connected to the comparators 95 via a switch, the ON/OFF of which is controlled by the processor 95.

Referring to FIGS. 1A-1B, 6A-6C and 7A-7C again, an operating method of the motion detection device 400 of the present disclosure includes the steps of: generating a reference image (e.g., FIG. 1A) in which one pixel column (e.g., odd pixel column) among a pair of pixel columns is exposed by a first shutter time and the other one pixel column (e.g., even pixel column) among the pair of pixel columns is exposed by a second shutter time, different from the first shutter time; comparing light signals in the reference image at the one pixel column among the pair of pixel columns with light signals in the reference image at the other one pixel column among the pair of pixel columns by multiple comparators (e.g., shown as comparator 1 to comparator 5 in FIG. 4) to generate a reference feature position map (e.g., FIG. 1B); generating a current image (e.g., FIGS. 6A and 7A) in which the one pixel column (e.g., odd pixel column) among the pair of pixel columns is exposed by the first shutter time and the other one pixel column (e.g., even pixel column) among the pair of pixel columns is exposed by the first shutter time; comparing light signals in the current image at the one pixel column among the pair of pixel columns with light signals in the current image at the other one pixel column among the pair of pixel columns by the multiple comparators to generate a current feature position map (e.g., FIGS. 6B and 7B); and processing the reference feature position map and the current feature position map by the multiple flip flops (e.g., shown as FFr1 and FFr2 in FIG. 4) and the multiple logic check circuits (e.g., shown as LC1 and LC2 in FIG. 4) to detect a motion. The operating method is also adaptable to the second embodiment shown in FIGS.

8A to 8C, only two reference feature position maps and two current feature positions maps being generated depending on ON/OFF states of switches.

In the present disclosure, the pair of pixel columns of the pixel array includes one even pixel column and one odd pixel column as described in the first embodiment, or includes one even pixel column and two odd pixel columns or one odd pixel column and two even pixel columns as described in the second embodiment.

As mentioned above, the processor 35/95 marks strong features in the reference feature position map and ignores positions in the reference feature position map (also in the current feature position map) without the strong features.

To save power, the multiple logic check circuits only processes (e.g., controlled by the processor 35/95) a part of the strong features in the reference feature map and positions in the current feature position map corresponding to the part of the strong features. That is, not all strong features are considered in detecting a motion.

It should be mentioned that although FIG. 2 shows that each pixel includes a second circuit groups (e.g., shown as $29_{odd}$ and $29_{even}$) for storing another light signals in a storage capacitor INTD (e.g., exposed in a different exposure time from light signals stored in a storage capacitor INT), it is only intended to illustrate but not to limit the present disclosure. In another aspect, the pixels in the parcel array 31/91 do not include the second circuit groups $29_{odd}$ and $29_{even}$. In a further aspect the upper part of the comparator is coupled to the drains of source followers sf3 and sf4, and the lower part of the comparator is coupled to OUTD.

It should be mentioned that although the present disclosure is described in the way that the strong features are those odd/even pixels brighter than even/odd pixels, it is only intended to illustrate but not to limit the present disclosure. In another aspect, the strong features are defined as odd/even pixels darker than even/odd pixels, which may be implemented by changing the connections between drains of the source follower sf1 and sf2 and the comparators.

In conventional motion detectors, a sensor thereof needs three phases of processing to complete one frame in order to confirm a motion. Said three phases include shutter exposure, data transferring and signal processing. However, in the present disclosure, there is no data transferring from the analog block to digital block and no pixel data processing such that power consumption of processing pixel data is saved. Furthermore, in the present disclosure, comparators/amplifiers are built in pixels.

It should be mentioned that although the present disclosure is described in the way that the position maps are compared and the logic check result is calculated in the analog phase, it is only intended to illustrate but not to limit the present disclosure. In another aspect, the position maps are firstly converted (by ADC) into digital phase, and then a processor performs the logic check result in the digital phase.

As mentioned above, because the conventional motion detector firstly stores light signals in a pixel capacitor acquired earlier to be compared with light signals acquired later, energy of the light signals stored earlier will decay in an interval time between two exposure times. Accordingly, the present disclosure further provides a motion detection device (e.g., referring to FIGS. 4 and 10) and a motion detection method thereof (e.g., referring to FIGS. 1A-1B, FIGS. 6A-7C and 8A-8C) that store a position map of strong features in multiple flip-flops to be compared, in an analog phase, with a new position map to obtain a logic check result of a position variation of the strong features. If there is no motion, these strong features stay at the same locations in the new position map; whereas if there is a motion, these strong features will appear in other locations in the new position map. Because the multiple flip-flops only record digital "1" and "0", the energy decaying problem can be resolved.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

The invention claimed is:

1. A motion detection device, comprising:
    a first pixel;
    a second pixel, adjacent to the first pixel; and
    a comparator, coupled to the first pixel and a second pixel, and configured to
        output a first comparison result indicating a first signal difference between the first and second pixels as a reference difference,
        output a second comparison result indicating a second signal difference between the first and second pixels as a current difference, wherein
    the first comparison result is obtained by exposing the first pixel and the second pixel using different shutter times, and
    the second comparison result is obtained by exposing the first pixel and the second pixel using a same shutter time.

2. The motion detection device as claimed in claim 1, wherein the first pixel and the second pixel respectively comprise:
    a source follower transistor, drains of source follower transistors of the first pixel and the second pixel being coupled to a differential pair of the comparator; and
    a readout transistor, sources of readout transistors of the first pixel and the second pixel being coupled to a current source of the comparator.

3. The motion detection device as claimed in claim 1, wherein the first comparison result and the second comparison result are respectively obtained from difference image frames.

4. The motion detection device as claimed in claim 1, wherein
    in obtaining the first comparison result, the first pixel is exposed by a first shutter time and the second pixel is exposed by a second shutter time, and the second shutter time is 10% to 20% longer than the first shutter time, and
    in obtaining the second comparison result, the same shutter time is identical to the first shutter time.

5. The motion detection device as claimed in claim 1, further comprising a flip flop coupled to the comparator and configured to record the first comparison result.

6. The motion detection device as claimed in claim 5, further comprising a logic check circuit coupled to the comparator and the flip flop.

7. The motion detection device as claimed in claim 6, wherein the logic check circuit comprises:
    an inverter, an input of the inverter configured to receive the second comparison result; and
    an AND gate, a first input of the AND gate configured to receive the first comparison result from the flip flop, and a second input of the AND gate coupled to an output of the inverter.

8. The motion detection device as claimed in claim 1, wherein the motion detection device comprises:
    multiple pairs of the first and second pixels arranged in a matrix; and
    multiple comparators, each being configured to be coupled to one column of the multiple pairs of the first and second pixels in the matrix,
    wherein the multiple comparators are configured to output multiple first comparison results as a reference feature position map and output multiple second comparison results as a current feature position map.

9. The motion detection device as claimed in claim 8, wherein the multiple comparators are arranged corresponding to only a part of columns of the multiple pairs of the first and second pixels in the matrix.

10. The motion detection device as claimed in claim 8, further comprising:
    multiple logic check circuits, configured to process the reference feature position map and the current feature position map; and
    a processor, configured to determine a number of second comparison results in the current feature position map to be processed by the multiple logic check circuits according to first comparison results that indicate strong features in the reference feature position map.

11. A motion detection device, comprising:
    a first pixel;
    a second pixel and third pixel, adjacent to the first pixel at two sides of the first pixel; and
    a comparator, coupled to the first pixel without via any switch, coupled to the second pixel via a second switch and coupled to the third pixel via a third switch, and the comparator configured to
        output a first comparison result indicating a signal difference between the first and second pixels as a first reference difference,
        output a second comparison result indicating a signal difference between the first and third pixels as a second reference difference,
        output a third comparison result indicating a signal difference between the first and second pixels as a first current difference, and
        output a fourth comparison result indicating a signal difference between the first and third pixels as a second current difference, wherein
    the first comparison result is obtained by exposing the first pixel and the second pixel using different shutter times,
    the second comparison result is obtained by exposing the first pixel and the third pixel using different shutter times,
    the third comparison result is obtained by exposing the first pixel and the second pixel using a same shutter time, and
    the fourth comparison result is obtained by exposing the first pixel and the third pixel using the same shutter time.

12. The motion detection device as claimed in claim 11, wherein
    the first comparison result and the second comparison result are obtained from a first image frame, and
    the third comparison result and the fourth comparison result are obtained from a second image frame, different from the first image frame.

13. The motion detection device as claimed in claim 11, wherein in obtaining the first comparison result, the first pixel is exposed by a first shutter time and the second pixel is exposed by a second shutter time, in obtaining the second comparison result, the first pixel is exposed by the first shutter time and the third pixel is exposed by the second shutter time, and the second shutter time is 10% to 20% longer than the first shutter time.

14. The motion detection device as claimed in claim 11, further comprising:
   a first flip flop, coupled to the comparator via a first output switch to receive the first comparison result; and
   a second flip flop, coupled to the comparator via a second output switch to receive the second comparison result.

15. The motion detection device as claimed in claim 14, further comprising:
   a first logic check circuit, connected to the first flip flop and coupled to the comparator via the first output switch; and
   a second logic check circuit, connected to the second flip flop and coupled to the comparator via the second output switch.

16. An operating method of a motion detection device, the motion detection device comprising a pixel array, multiple comparators respectively coupled to a pair of pixel columns of the pixel array, multiple flip flops each coupled to one comparator, and multiple logic check circuits each coupled to one flip flop and one corresponding comparator coupled to the one flip flop, the operating method comprising:
   generating a reference image in which one pixel column among the pair of pixel columns is exposed by a first shutter time and the other one pixel column among the pair of pixel columns is exposed by a second shutter time, different from the first shutter time;
   comparing light signals in the reference image at the one pixel column among the pair of pixel columns with light signals in the reference image at the other one pixel column among the pair of pixel columns by the multiple comparators to generate a reference feature position map;
   generating a current image in which the one pixel column among the pair of pixel columns is exposed by the first shutter time and the other one pixel column among the pair of pixel columns is exposed by the first shutter time;
   comparing light signals in the current image at the one pixel column among the pair of pixel columns with light signals in the current image at the other one pixel column among the pair of pixel columns by the multiple comparators to generate a current feature position map; and
   processing the reference feature position map and the current feature position map by the multiple flip flops and the multiple logic check circuits to detect a motion.

17. The operating method as claimed in claim 16, wherein the second shutter time is 10% to 20% longer than the first shutter time.

18. The operating method as claimed in claim 16, further comprising:
   marking strong features in the reference feature position map; and
   ignoring positions in the reference feature position map without the strong features.

19. The operating method as claimed in claim 18, wherein in detecting the motion, the multiple logic check circuits only processes a part of the strong features in the reference feature map and positions in the current feature position map corresponding to the part of the strong features.

20. The operating method as claimed in claim 16, wherein the pair of pixel columns of the pixel array comprises:
   one even pixel column and one odd pixel column, or
   one even pixel column and two odd pixel columns.

\* \* \* \* \*